United States Patent Office 3,597,403
Patented Aug. 3, 1971

3,597,403
NOVEL CATALYSTS FOR THE RING-OPENING POLYMERIZATION OF UNSATURATED ALICYCLIC COMPOUNDS
Eilert A. Ofstead, Cuyahoga Falls, Ohio, assignor to The Goodyear Tire & Rubber Company, Akron, Ohio
No Drawing. Filed Oct. 27, 1969, Ser. No. 869,909
Int. Cl. C08f *7/02, 15/04*
U.S. Cl. 260—88.2
8 Claims

ABSTRACT OF THE DISCLOSURE

There is disclosed a process for the ring-opening polymerization of certain unsaturated alicyclic compounds which comprises subjecting said unsaturated alicyclic compounds to a catalyst system comprising (A) at least one compound selected from a group consisting of alkylaluminum dihalides, alkylaluminum sesquihalides and aluminum halides, (B) at least one compound selected from the group consisting of molecular oxygen, chlorine, bromine, iodine and cyanogen halides, and (C) at least one transition metal compound selected from the group consisting of tungsten and molybdenum carbonyl complex compounds corresponding to the formula $M(CO)_4R$ where M is tungsten and molybdenum and R is an unsaturated hydrocarbon compound having at least two non-conjugated carbon-to-carbon double bonds and wherein R is attached to the transition metal by coordination through two carbon-to-carbon double bonds.

---

This invention relates to a process for polymerizing unsaturated alicyclic compounds and to the products resulting therefrom. In its broad aspect, the invention is directed to the preparation of polymers derived from unsaturated alicyclic compounds which contain at least one alicyclic ring structure containing at least two carbon atoms connected through a double bond. It is also related to catalyst systems useful in the process for polymerizing unsaturated alicyclic compounds.

The polymerization process of this invention may be used to prepare novel solid polymers. The properties and characteristics of the polymers can be "tailor made" to fit a wide variety of uses and fields of application. The properties and characteristics of the polymers resulting from the polymerization process of this invention can be varied over a wide range dependnig on (1) the particular unsaturated alicyclic monomer chosen to be polymerized, (2) the particular polymerization catalyst employed, and (3) the particular polymerization conditions employed. The products resulting from the polymerization of this invention can be employed in a variety of applications; for example, they may be employed to produce finished rubber articles such as pneumatic tires, molded goods and the like or they may be materials which are useful to manufacture articles such as films and fibers. They may also be employed to form finished products by molding techniques.

This invention comprises polymerizing at least one alicyclic compound selected from the group consisting of (1) unsaturated alicyclic compounds containing at least four and not more than five carbon atoms in the cyclic ring and containing one carbon-to-carbon double bond in the cyclic ring, and (2) unsaturated alicyclic compounds containing at least seven carbon atoms in the cyclic ring and containing at least one carbon-to-carbon double bond in the cyclic ring, by subjecting said alicyclic compounds to ring-opening polymerization conditions, in the presence of a catalyst system comprised of (A) at least one compound selected from a group consisting of alkylaluminum dihalides, alkylaluminum sesquihalides and aluminum halides, (B) at least one compound selected from a group consisting of molecular oxygen, chlorine, bromine, iodine and cyanogen halides, and (C) at least one transition metal compound selected from the group consisting of tungsten and molybdenum complexes corresponding to the formula $M(CO)_4R$ where M is tungsten and molybdenum, C is carbon, O is oxygen and R is an unsaturated hydrocarbon compound having at least two non-conjugated carbon-to-carbon double bonds and where R is attached to the transition metal by coordination through two carbon-to-carbon double bonds.

Representative examples of the compounds useful as the (A) catalyst component include alkylaluminum dihalides such as ethylaluminum dichloride, isobutylaluminum dichloride, propylaluminum dichloride, ethylaluminum dibromide, ethylaluminum diiodide and the like; alkylaluminum sesquihalides such as ethylaluminum sesquichloride, methylaluminum sesquichloride, methylaluminum sesquibromide and the like; and aluminum halides such as aluminum chloride, aluminum bromide and the like.

Compounds useful as the (B) catalyst component of the present invention include molecular oxygen, chlorine, bromine, iodine and cyanogen halides representative of which are cyanogen chloride, cyanogen bromide and the like.

Representative examples of the compounds useful as the (C) catalyst component defined above and where R, the unsaturated hydrocarbon compound, is selected from a group consisting of alkapolyene, cycloalkapolyene and polycycloalkapolyene compounds having at least two non-conjugated carbon-to-carbon double bonds include 1,5-hexadiene tungsten tetracarbonyl; 1,5 - cyclooctadiene tungsten tetracarbonyl; norbornadiene tungsten tetracarbonyl; dicyclopentadiene tungsten tetracarbonyl; 1,5-cyclooctadiene molybdenum tetracarbonyl and norbornadiene molybdenum tetracarbonyl and the like.

Various unsaturated alicyclic compounds may be polymerized in the practice of this invention. Unsaturated alicyclic compounds useful in accordance with this invention are selected from the group consisting of (A) alicyclic compound corresponding to the formula:

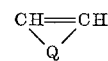

(I)

wherein:
(1) Q is a fragment which comprises a sequence of at least 5 carbon atoms situated in linear succession between the methylene carbons which constitute the double bond;
(2) The carbon atoms in the linear succession of Q may be interconnected by both carbon-to-carbon single bonds and carbon-to-carbon double bonds;
(3) Any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
(4) Any of said carbon atoms in the linear succession of Q may be constituents of aromatic rings and alicyclic rings; and
(5) Said alicyclic unsaturated hydrocarbon contains no conjugated double bonds; (B) alicyclic compounds corresponding to the formula:
wherein:

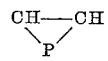

(II)

wherein:
(1) P is a fragment which comprises a sequence of at least 2 and not more than 3 carbon atoms situated in linear succession between the methylidene carbons which constitute the double bond;

(2) The carbon atoms in linear succession of P are connected by carbon-to-carbon single bonds;

(3) Any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;

(4) Any of said carbons in linear succession of P may be constituents of aromatic rings and alicyclic rings, and (5) Said alicyclic unsaturated hydrocarbon compound contains no conjugated double bonds; and (C) alicyclic compounds corresponding to the formula:

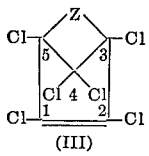

(III)

where Z represents:

(1) A vinylene double bond of the formula

—CH=CH—;

or (2) A hydrocarbon fragment containing:

(a) At least four carbon atoms situated in a linear succession between carbons 3 and 5 of (III);

(b) At least one —CH=CH— grouping, said

—CH=CH— grouping being a constituent of at least one 4 or 5 or 7 or larger membered ring;

(c) Any remaining carbon in the linear succession other than the carbons of said —CH=CH— groupings may be substituted by at least one member of the group consisting of alkyl, aryl, alkenyl, aralkyl, alkaryl, cycloalkyl, cycloalkenyl, bicycloalkyl, bicycloalkenyl and chlorine radicals;

(d) Any of the said carbon atoms in the linear succession of Z may be constituents of alicyclic rings; and (e) (III) contains no non-aromatic conjugated double bonds.

The unsaturated hydrocarbon compounds useful in accordance with the present invention and as defined by the Formulas I, II, and III set forth above include both mono- and polycyclic unsaturated hydrocarbon compounds. Representative examples of polycyclic unsaturated hydrocarbon compounds within the scope of this invention include 2,2,2-bicycloöctene-2, norbornene, norbornadiene and the like.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing one or more non-conjugated carbon-to-carbon double bonds in the cyclic ring include cycloöctene; 1,4- and 1,5- cycloöctadiene; 1,4,7-cyclononatriene; 1,4-, 1,5- and 1,6-cyclodecadiene; 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cycloöctene, cyclododecene, and 1,5-cycloöctadiene, 1,5,9-cyclododecatriene and 1,9,17-cyclotetracosatriene.

Representative examples of substituted alicyclic compounds are alkyl-substituted compounds such as 1-methyl-1,5-cycloöctadiene; aryl-substituted compounds such as 3-phenyl-1-cycloöctene; aralkyl-substituted compounds such as 3-benzyl-1-cycloöctene; alkaryl-substituted compounds such as 3-tolyl-1-cycoöctene and halogen-substituted compounds such as as 5-chloro-1-cycloöctene, 1-chloro-1,5-cycloöctadiene; 5-chloro-1-cyclododecene and 5,6-dichloro-1-cycloöctene. Mixtures of the unsaturated alicyclic compounds may be polymerized including both substituted, unsaturated alicyclic compounds and the unsubstituted unsaturated alicyclic compounds.

The catalysts employed in this invention are prepared by mixing the components by known techniques. Thus, the catalysts may be prepared by "preformed" or "in situ" techniques. By "preformed" is meant the manner in which the catalyst components are mixed together prior to exposure of any of the catalyst components to the monomer to be polymerized. By "in situ" is meant that the catalyst components are added separately to the monomer to be polymerized. The catalyst components can be mixed either as pure compounds or as suspensions or solutions in liquids which do not adversely affect the ring-opening polymerization. Representative of such liquids are saturated hydrocarbons such as hexane, pentane and the like; alicyclic hydrocarbons such as cyclohexane, cycloöctane and the like; and aromatic hydrocarbons such as benzene, toluene and the like.

However, for both the "preformed" and the "in situ" techniques of catalyst addition, certain orders of addition of the three catalyst components are preferred. For example, in the "preformed" technique, it is preferred to combine components (B) and (C), described above, and then to combine this mixture with the monomer either before or after the (A) component is combined with the monomer. For the "in situ" technique, it is preferred that component (C) should be either the first or the second component to be combined with the monomer. Although the above are the preferred orders of mixing or adding the various components to each other or to the polymerization system, they are not to be interpreted as excluding other orders of mixing or addition.

The amount of catalyst employed may be varied over a wide range of concentrations. Any establishment of an arbitrary catalytic concentration for one of the catalyst components will determine the preferred relative concentrations of the remaining two catalyst components. Thus, the relative concentrations of the catalyst components, (A), (B) and (C), are interdependent. This interdependency of the catalyst components (A), (B) and (C) also depends on a number of other factors such as temperature, reactant used, purity of reactant, reaction times desired and the like. Of course, a catalytic amount, preferably at least about $5 \times 10^{-5}$ moles, of catalyst must be employed and those skilled in the art will be readily able to determine the optimum catalytic range.

It has been found that successful results are obtained in the practice of this invention when the mole relationship between the catalyst components (A), (B) and (C) as defined above are within a mole ratio of $(A)/(C)$ ranging from about 0.1/1 to about 100/1 and a mole ratio of $(B)/(A)$ ranging from about 0.05/1 to about 10/1.

The preferred mole ratio of $(A)/(C)$ ranges from about 0.5/1 to about 20/1 and the preferred mole ratio of $(B)/(A)$ ranges from about 0.1/1 to about 5/1.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, heptane, hexane, petroleum ether, decane; and alicyclic hydrocarbons such as cyclohexane, decalin and cyclooctane. Mixtures of such solvents may also be used.

Temperatures at which the polymerization reaction is carried out can be varied over a wide range. Usually the temperature can be varied from extremely low temperatures such as about −60° C. up to high temperatures such as 150° C. or higher. Thus, the temperature is not a critical factor of the invention. It is generally preferred, however, to conduct the reaction at a temperature in the range of from about −20° C. to about 80° C. The pressure at which the polymerization reaction is carried out can also be varied over a wide range. The reaction can be conducted at atmospheric pressure or, if desired, it can be carried out a sub-atmospheric pressure or super-atmospheric pressure. Generally, a satisfactory polymerization is obtained when the reaction is carried out at about autogenous pressure, as is developed by the process invention. This constitutes a great advantage for this ring-opening type of polymerization over conventional addition polymerization.

The low volume decrease accompanying a ring-opening polymerization is another major advantage over conventional addition polymerization, particularly where these monomers are bulk polymerized to form potting compounds and various articles, examples of which are molded plastic materials, molded rubber-like goods, shoe soles and heels, industrial belts and vehicle tires.

In these applications the monomer may be polymerized in the presence of one or more reinforcing carbon blacks, pigments or resins and certain antioxidants. The products made by this procedure may be crosslinked by adding polymerizable poly functional compounds to the main monomer. The molded products made by ring-opening polymerization may be crosslinked by exposure to ionizing radiation such as gamma rays, X-rays, or electrons. These molded products may also be crosslinked or vulcanized by incorporating certain compounds which on heating during or subsequent to the polymerization will lead to conventional crosslinking or vulcanization of these polymers.

The following examples are set forth to further illustrate the nature of this invention. However, it should be understood that the examples are set forth for illustrative and not for limitative purposes.

Inherent viscosities (I.V.) were determined on 0.1 percent (wt./vol.) solutions of the polymers in benzene at 25° C. and are expressed in deciliters per gram (dl./g.). All experiments were conducted in an atmosphere of nitrogen unless noted otherwise.

EXAMPLE I

A series of polymerization reactions was carried out employing a premix consisting of 10 milliliters (ml.) of freshly distilled cyclooctene and 40 ml. of anhydrous benzene in each polymerization. All manipulations of charging monomer, solvent and catalyst components were conducted under a nitrogen atomsphere. The catalyst system employed consisted of a 0.1 molar solution of 1,5-cyclooctadiene tungsten tetracarbonyl complex [1,5-COD·W-(CO)$_4$] in benzene, a 0.2 molar solution of ethylaluminum dichloride (EADC) in benzene, and molecular oxygen (gas). The in situ technique was employed to introduce the catalyst to the polymerization premixes. All of the reactions were carried out at room temperature for 30 minutes. At the end of the 30 minute reaction time, each polymerization was terminated by the addition of 1.0 ml. of a 2 percent (wt./vol.) solution of ditertiarybutyl-p-cresol in methyl alcohol. Representative data are given in Table I below:

TABLE I

| Experiment Number | 1,5-COD.W(CO)$_4$, moles ×10$^4$ | EADC, moles ×10$^4$ | O$_2$ (gas), moles ×10$^4$ | Yield, weight percent | I.V. |
|---|---|---|---|---|---|
| 1 | 0.5 | 4.0 | 0.4 | 12.0 | 1.50 |
| 2 | 0.5 | 4.0 | 0.6 | 48.0 | 1.94 |
| 3 | 0.5 | 4.0 | 2.0 | 93.0 | 1.84 |
| 4 | 0.25 | 2.0 | 1.0 | 96.0 | [a]ND |
| 5 | 0.25 | 2.0 | 1.0 | 83.0 | [a]ND |

[a] Not determined.

EXAMPLE II

One polymerization was run on a premix containing 10 ml. of freshly distilled cyclooctene (CO) and 40 ml. of anhydrous benzene. The catalyst system employed consisted of a 0.1 molar solution of 1,5-COD·W(CO)$_4$ in benzene, a 0.2 molar solution of EADC in benzene and a 0.1 molar solution of Br$_2$ in benzene. The amounts of these materials employed were 1.0 ml. (1×10$^{-4}$ moles), 2.0 ml. (4×10$^{-4}$ moles) and 1.0 ml. (1×10$^{-4}$ moles) respectively. The catalyst components were added by means of the in situ technique. The polymerization was carried out for 30 minutes at room temperature and the yield was 37 percent by weight of a solid rubbery polymer.

EXAMPLE III

One polymerization experiment was carried out similar to Example I above except that a 0.2 molar suspension of aluminum chloride in cyclohexane was employed instead of the 0.2 molar solution of EADC in benzene. The in situ technique was employed to introduce 1.0 ml. of 0.1 molar 1,5-COD·W(CO)$_4$, 2.0 ml. of 0.2 molar AlCl$_3$ and 2.5 ml. of molecular oxygen (gas). The reaction gave a yield of 78 percent by weight of a solid rubbery polymer.

EXAMPLE IV

A series of three polymerization reactions was carried out on a premix consisting of 20 percent by volume of cyclooctene in benzene. Two preformed catalyst solutions were prepared by combining an appropriate amount of a 0.1 molar solution of bromine in benzene with an appropriate amount of a 0.1 molar solution of 1,5-COD·W(CO)$_4$ in benzene. In experiments Nos. 1 and 2 these two catalyst components were combined in a 1/1 volume ratio. In experiment number 3, they were combined in a 2/1 volume ratio. In experiment number 1, 2.0 ml. of a 0.2 molar solution of AlBr$_3$ in benzene was empoled and in exepriments numbers 2 and 3, 2.0 ml. and 4.0 ml. respectively of a 0.2 molar solution of EADC was employed. All reactions were carried out at room temperature for 30 minutes. Table II below gives all pertinent data:

TABLE II

| Experiment Number | 1,5-COD·W(CO)$_4$, moles ×10$^4$ | Al compound, moles×10$^4$ | Br$_2$, moles×10$^4$ | Yield, weight percent |
|---|---|---|---|---|
| 1 | 1.0 | 4 | 1.0 | 60.5 |
| 2 | 1.0 | 4 | 1.0 | 32.9 |
| 3 | 1.0 | 8 | 2.0 | 100.0 |

EXAMPLE V

A bulk polymerization was carried out on 8.4 grams of cyclooctene employing a catalyst consisting of 1.0 ml. of a preformed 0.05 molar solution of 1,5-COD·W(CO)$_4$ complex and cyanogen bromide and 1.0 ml. of a 0.2 molar solution of EADC in benzene. The reaction was carried out for 1 hour at 25° C. and gave a yield of 3.6% by weight of a solid rubbery polymer.

EXAMPLE VI

Two bulk polymerizations were carried out employing 18.3 grams of cyclopentene in each. To the monomer of the first experiment was added 0.25 ml. of a 0.1 molar solution of 1,5-COD·W(CO)$_4$ complex, 1.0 ml. of a 0.2 molar solution of EADC and 2.5 ml. of molecular oxygen to yield 24.1 percent by weight of a rubbery polymer. To the monomer of the second experiment was added 0.25 ml. of the 0.1 molar 1,5-COD·W(CO)$_4$ complex, 1.0 ml. of the EADC component and 2.0 ml. of a 0.05 molar solution of iodine (I$_2$) in benzene to give a yield of 3.5 percent by weight of a rubbery solid. Both experiments were carried out at 25° C. for 1 hour.

EXAMPLE VII

One polymerization was carried out on a premix containing 18.3 grams of cyclopentene in 25 ml. of anhydrous benzene. The in situ technique was employed to add the catalyst components which consisted of 0.25 ml. of a 0.1 molar solution of 1,5-COD·W(CO)$_4$, 1.0 ml. of a 0.2 molar solution of EADC and 2.5 ml. of molecular oxygen. The yield of rubbery polymer was 79.0 percent by weight.

EXAMPLE VIII

A bulk polymerization reaction was carried out on sodium distilled cyclooctene employing a catalyst system comprising 0.1 molar solution of norbornadiene molybdenum tetracarbonyl in benzene, a 0.2 molar solution of bromine in benzene and a 0.2 molar solution of EADC in benzene. The norbornadiene molybdenum tetracarbonyl solution (4.0 ml.) and the bromine solution (4.0 ml.) were first combined in the reaction vessel followed next by the addition of 20.0 ml. of cyclooctene and then 2.0 ml. of the EADC solution. The reaction was carried out at room temperature (~25° C.) for 45 minutes and then terminated with methanol and antioxidant added. The polymerization yielded 30.5 percent by weight of a solid rubbery polymer.

While certain representative embodiments and details have been shown for the purpose of illustrating the invention, it will be apparent to those skilled in this art that various changes and modifications may be made therein without departing from the spirit or scope of the invention.

What is claimed is:

1. A polymerization process comprising polymerizing at least one unsaturated alicyclic compound selected from the group consisting of (1) unsaturated alicyclic compounds containing four or five carbon atoms in the cyclic ring and containing one carbon-to-carbon double bond in the cyclic ring and (2) unsaturated alicyclic compounds containing from seven to twelve carbon atoms in the cyclic ring and containing at least one carbon-to-carbon double bond in the cyclic ring, by subjecting said alicyclic compounds either alone or in mixture with each other to polymerization conditions in the presence of a catalyst system comprising (A) at least one compound selected from a group consisting of alkylaluminum dihalides, alkylaluminum sesquihalides and aluminum halides, (B) at least one compound selected from a group consisting of molecular oxygen, chlorine, bromine, iodine and cyanogen halides and (C) at least one transition metal compound selected from the group consisting of tungsten and molybdenum complexes corresponding to the formula M(CO)$_4$R where M is tungsten and molybdenum, C is carbon, O is oxygen and R is an unsaturated hydrocarbon compound having at least two non-conjugated carbon-to-carbon double bonds and where R is attached to the transition metal by coordination through two carbon-to-carbon double bonds and wherein the mole ratio of (A)/(C) ranges from about 0.1/1 to about 100/1 and where the mole ratio of (B)/(A) ranges from about 0.05/1 to about 10/1.

2. A process according to claim 1 wherein the mole ratio of (A)/(C) ranges from about 0.5/1 to about 20/1 and where the mole ratio of (B)/(A) ranges from about 0.1/1 to about 5/1.

3. A process according to claim 1 in which the unsaturated alicyclic componnd contains four or five carbon atoms and only one carbon-to-carbon double bond in the cyclic ring.

4. A process according to claim 1 in which the unsaturated alicyclic compound contains from seven to twelve carbon atoms in the cyclic ring and contains from one to three carbon-to-carbon double bonds in the cyclic ring which are located in a relation to each other such that they are not conjugated.

5. A process according to claim 1 in which the polymerization is conducted in bulk.

6. A process according to claim 1 in which the polymerization is conducted in solution.

7. A catalyst composition comprised of (A) at least one compound selected from a group consisting of alkylaluminum dihalides, alkylaluminum sesquihalides and aluminum halides, (B) at least one compound selected from a group consisting of molecular oxygen, chlorine, bromine, iodine and cyanogen halides and (C) at least one transition metal compound selected from the group consisting of tungsten and molybdenum complexes corresponding to the formula M(CO)$_4$R where M is tungsten and molybdenum, C is carbon, O is oxygen and R is an unsaturated hydrocarbon compound having at least two non-conjugated carbon-to-carbon double bonds and where R is attached to the transition metal by coordination through two carbon-to-carbon double bonds and where the mole ratio of (A)/(C) ranges from about 0.1/1 to about 100/1 and where the mole ratio of (B)/(A) ranges from about 0.05/1 to about 10/1.

8. A catalyst composition according to claim 7 wherein the mole ratio of (A)/(C) ranges from about 0.5/1 to about 20/1 and where the mole ratio of (B)/(A) ranges from about 0.1/1 to about 5/1.

References Cited

UNITED STATES PATENTS

| | | | |
|---|---|---|---|
| 3,449,310 | 6/1969 | Dall'Asta | 260—93.1 |
| 3,458,489 | 7/1969 | Natta et al. | 260—93.1 |
| 3,476,728 | 11/1969 | Natta et al. | 260—93.1 |

JOSEPH L. SCHOFER, Primary Examiner

R. A. GAITHER, Assistant Examiner

U.S. Cl. X.R.

252—429B, 431N, 431R; 260—93.1, 87.5